INVENTOR.
ERWIN G. ROEHM
BY
H. K. Parsons & L. W. Wright,
ATTORNEYS

United States Patent Office 2,741,952
Patented Apr. 17, 1956

2,741,952

CONTOURING MACHINE CONTROL

Erwin G. Roehm, Norwood, Ohio, assignor to The Cincinnati Milling Machine Co., Cincinnati, Ohio, a corporation of Ohio Application June 3, 1953, Serial No. 359,311

14 Claims. (Cl. 90—13.5)

This invention relates to improvements in milling machines or like machine tools and has particular reference to automatic reproduction machine tools utilized for the performance of profiling, contouring, and similar operations.

One of the principal objects of the present invention is the provision of an improved tracer mechanism and associate parts which will positively and accurately control high speed operations of a machine tool.

Another object of the invention is the provision of an improved tracer and associated mechanism automatically to effect a slowing down of the rate of relative movement of the cutting tool and the work piece when sharp deviations are to be made in the path of the outline or contour being followed.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 1:
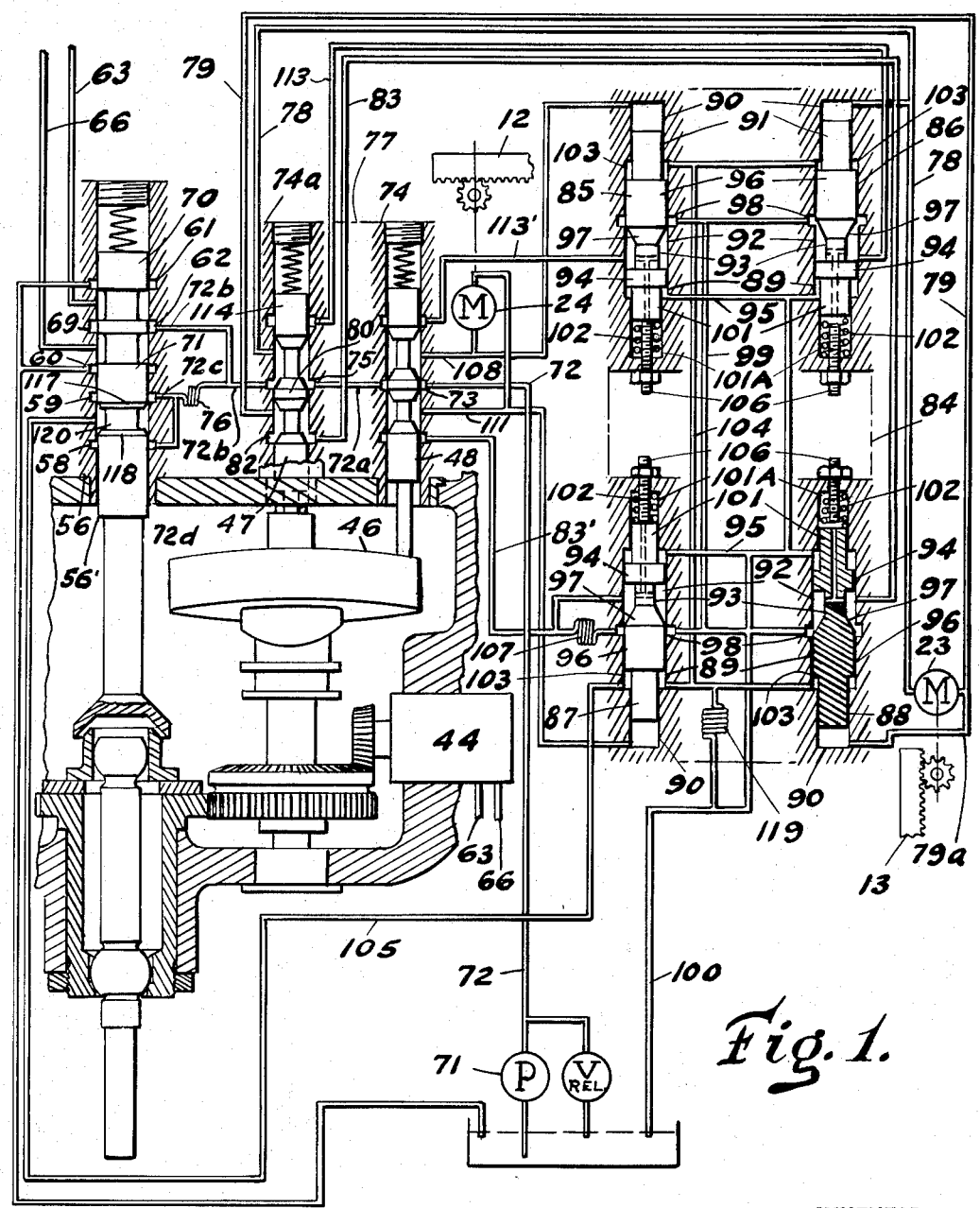
Figure 1 is a diagrammatic view of the control and operating circuits with the valve mechanisms and associated actuators shown in section.
Figure 2:
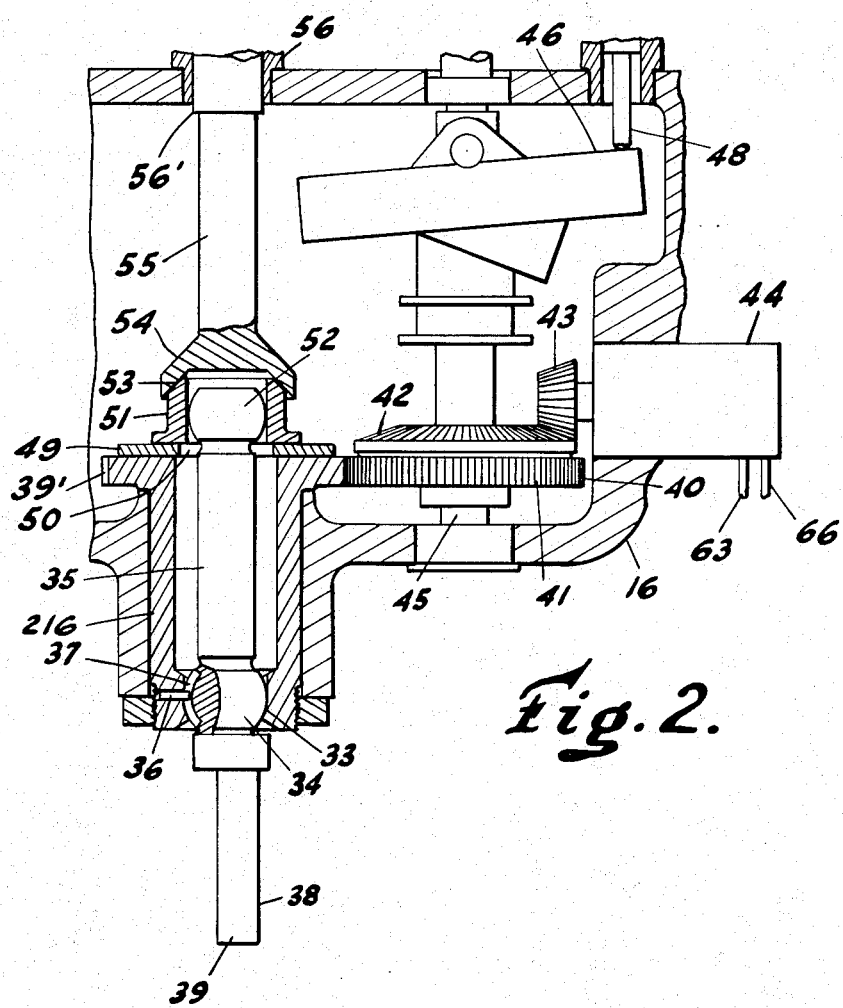
Figure 2 is a sectional view of the tracing mechanism.

The machine structure in which the present invention is utilized is of the type shown in my United States Letters Patent 2,332,533.

In the patent is shown at 16 a first hydraulic motor corresponding in function to the motor 23 here shown for effecting translation of a reproducing machine element such as a table 13, and a second hydraulic motor at 14 corresponding in function to the motor 24 here shown for operating a ram or traversing slide 12. The present invention relates specifically to contouring tracer controlled hydraulic circuits and valve mechanisms for regulating the operation of these motors, and their controlled slides 12 and 13.

The tracer head structure, as shown in the drawing, is of the type shown in my co-pending application, Serial No. 315,594, now Patent No. 2,682,202 issued June 29, 1954, one embodiment in a complete machine being shown in my co-pending application, Serial Number 355,546, now Patent No. 2,726,582 issued December 13, 1955. The novel features of the present tracer mechanism and the valving mechanically or hydraulically controlled by movements of said tracer mechanism are particularly illustrated in the drawing in connection with a hydraulic diagram of the controlled circuits. As there shown, the tracer head unit 16 rotatably supports the sleeve 216 having a socket at 33 slidably and oscillatably receiving the ball 34 intermediately located on the tracer rod 35. A pin 36 carried by the sleeve 216 rides in an arcuate slot 37 in the ball to permit free vertical and oscillatory movements of the ball while preventing its rotation with respect to the sleeve 216. This is desirable since the present invention is preferably utilized in connection with a tracer finger 38 whose pattern contacting portion 39 is forwardly offset with respect to the axis of rotation of the sleeve 216. This offsetting introduces an anticipatory tracer deflection effect and on change of direction of the outline of the pattern the compensatory rotation of the tracer sleeve will cause an arcuate toward or from movement of the contactor with respect to a depression or eminence on the pattern, compensating for the tilting of the tracer in following the pattern contour quickly to reestablish the tracer in its neutral position.

As is conventional in machines of this type, the rotatably supported tracer sleeve 216 is provided with the gear 39' driven by the spur gear portion 40 of compound gear 41 which has a beveled portion 42 meshing with pinion 43 on the tracer rotation control motor 44. Gear 41 is supported by shaft 45 which is journaled in the tracer head 16 and carries the adjustable rate and direction controlling cam 46 cooperating with the rate and direction control plungers 47 and 48. The details of this cam structure are illustrated in said co-pending application, Serial No. 315,594.

Projecting inwardly from the wall of the tracer head or casing 16 in spaced relation to the gear 39' is the annular rib or plate 49 having a central aperture at 50 circumscribing the upper portion of the tracer sleeve 35. This plate slidably supports the collar 51 whose bore has a sliding fit with the surface of the ball 52 on the upper portion of the tracer rod 35. Collar 51 has a tapered upper end 53 cooperating with the interior of cone 54 on the valve stem 55. Interengagement of these parts is such that any pressure applied to the lower end of the tracer finger will rock the tracer about the ball 34 as a fulcrum, correspondingly oppositely displacing the ball 52 which will carry with it into eccentrically displaced position the collar 51. Upon such movement the upper inclined or tapered portion 53 of the collar will exert a camming action against the cone 54 effecting a vertical shifting of the valve stem 56' with reference to the fixed valve bushing 56 carried by the tracer head 16.

The valve bushing 56 is provided with the machine slow-down control groove 58, pressure groove 59, the exhaust grooves 60 and 61 and the main pressure groove 62. Ported into the bushing intermediate the grooves 61 and 62 is a first motor line 63 extending to one side of the tracer rotating motor 44. A second motor conduit 66 ported into the bushing between grooves 60 and 62 is coupled with the opposite side of motor 44. These conduits serve alternatively for pressure input and output or reservoir flow connections for motor 44, depending on the positioning of the tracer valve 56'.

As illustrated, the tracer is in a partially deflected or what is commonly termed a neutral position following along the straight portion of a pattern. In this position, the tracer valve 56' is raised to a point where the valve spool 69 is at a hydraulic neutral producing balanced pressure conditions in the intermediate zones between the spool 69 and spool 70 at the top of the valve and between spool 69 and spool 71 opposing groove 60 in the lower portion of the valve. In this position, a balanced pressure condition will exist in the lines 63 and 66 so that motor 44 will remain stationary. Any unbalance of this condition will cause an increase of pressure in either line 63 or line 66 and a corresponding decrease in the other line to cause motor 44 to rotate in one direction or the other and thus to rotate the tracer head and associate parts, tending to move the tracer contactor 38 to an intermediate or neutral position. It will be understood that during this rotation the control valves 47 and 48 will be suitably relatively adjusted by movement of the cam 46 to effect the directionally corrected relative movement of tracer and pattern and of cutter and work piece.

The prime actuating pressure for the tracer controlled valving and for actual movements of the slide operated motors is supplied by pump 71' through the general pressure conduit line or system 72 which, as shown, is coupled to pressure groove 73 of bushing 74 for valve 48 and by way of the connecting conduit 72a to pressure groove 75 of the bushing portion 74a for valve 47, it being understood that these bushings may be separately mounted or contained within a single valve block 77 according to the convenience of construction and location. From groove 75 an additional pressure conduit 72b connects pressure to groove 62 while branch 72c containing resistance 76 connects the pressure supply system to groove 59. It will be understood that in those instances where the pressure conduits are shown connected by way of bushing grooves that the pressure exists at all times in the several grooves and conduits irrespective of the position of the valves contained within the bushings and the distribution to other points which is controlled by the movement of the valves with respect to the bushings.

As shown, the valve 47 is depressed so that pressure groove 75 is coupled to motor conduit 78 extending to the longitudinal or traverse drive motor 23, while the opposite conduit 79 of the motor is connected through groove 82 to the back pressure or reservoir conduit 83, which extends to a discharge point in the valve block 84 adjacent valve 88. Valve 48 is shown in a central position, blocking forward pressure flow to conduits 108 and 111 for motor 24 and also blocking reservoir conduits 113' and 83'. The valve block 84 has four similar valve chambers receiving the balancing or blocking valves 85, 86, 87 and 88. Each chamber includes a valve receiving bore 89 in which one of the valves slide, and a reduced cylinder 90 receiving the piston portion 91 of the valve. Each has an intermediate return pressure receiving area at 92 opposite a reduced portion 93 of the valve. Each valve has the spool portions 94 and 96 and the block has the drain connection 95 preventing building up of pressure interfering with proper valve operation. The spool 96 has a tapered throttle portion 97 controlling the coupling of the exhaust pressure area 92 with the exhaust groove 98 of the block. The exhaust grooves 98 of the various valves are coupled by the common conduit system 99 with the general low pressure exhaust or return conduit system 100. The position of the individual valves 85, 86, 87, and 88 regulate and determine the flow from the respective central areas 92 by way of the throttle portions 97 to the return line. Each of these valves is provided with a hollow ported stem portion 101 riding in chamber 101A. The return pressure in chamber 99 reacts through said porting into chamber 101A to urge the valve toward open position in opposition to motor back pressure in chamber 90.

Additionally, each bushing has the cylinder or chamber 103 in which the spool 96 slides. The shoulder between 96 and the stem 101 provides a piston responsive to pressure in chamber 103 to move the valve toward closed position restricting the actual rate of exhaust flow of its controlled motor line irrespective of the flow controlling position or setting of the valves 47 and 48. The control conduit system 104 has branches coupled into the chambers 103 of the several bushings, and is, in turn, connected by the conduit 105 with the bore of the tracer valve bushing 56 intermediate the bushing grooves 58 and 59.

In the position of the valve 47 shown, the pressure in conduit 78 reacts on piston 91 of valve 86 to shift the valve into a closed position against the valve opening reaction of spring 102 while pressure flow into conduit 113 is prevented by the portion 114 of valve 47. All pressure across throttle 80 is therefore utilized for actuation of motor 23. The return pressure conduit 79 of motor 23 is coupled by conduit 79a with chamber 90 of valve 88, initially moving this valve toward closed position against the operation of its spring 102. The return circuit continues through conduit 79 across throttle of valve 47 which will cause a pressure drop as respects the flow into and through conduit 83 so that the pressure created in chamber 92 will be less than the pressure in chamber 90. This latter pressure reacts in chamber 101A, supplementing the action of spring 102 in decreasing the effect of the throttle 97.

The present structure operates for control of the rate of discharge from the exhaust side of the controlled motor 23 and likewise the controlled motor 24 in accordance with the principle that the rate of discharge across a given throttle opening is constant, irrespective of the actual pressures involved, for a constant pressure drop across the throttle. The rate of discharge flow is determined by the sum of the resistance or pressure drop effect created by the throttle 80 in accordance with positioning of the valve 47 and the throttle effect created by the throttle 97 in series with 80. In the operation of the machine a definite position is effected for the valve 47 while the valve 88 as an entirety is self-adjusting. Any increase in the initial motor back pressure in conduit 79—79a ahead of the throttle 80 reacts in chamber 90, tending to close throttle 96, increasing the resistance at this point, this pressure acting against the force of spring 102. Closing of the throttle causes a restriction in the flow through conduit 83 and a building-up of pressure, reducing the pressure drop across the throttle 80 and at the same time a building up of the pressure in the chamber 101a to supplement the action of spring 102 until the pressure values of spring 102 and the hydraulic pressure in chamber 101a are greater than the increased motor back pressure in chamber 90, the relation between these pressures determining the position of the throttle 97 to restore and maintain a constant pressure drop across the throttle 80 and consequently a constant rate of flow of the motor exhaust fluid in accordance with the setting of the throttle 80.

The same action takes place as respects the individual valves 85, 86 and 87 when the rate valve or valves 47 and 48 are so positioned that the return pressure flow from the motor or motors 23 and 24 is coupled with one of the individual exhaust flow control valves.

Connected to the grooves 58 and 59 of the tracer valve bushing 56 through resistance 76 is the pressure conduit 72c. Pronounced upward or downward movement of the tracer valve 56' effected by "over-deflection" of tracer will couple either conduit 72c or conduit 72d by way of conduits 105—104 with the chambers 103. Pressure thus introduced will supplement the pressure in the chambers 90 of the several valves 85, 86, 87, 88, urging all of the valves toward a throttle closing position to slow down and block or stop the exhaust flow and thus the operation of motors 23 and 24 until, as by rotation of the tracer head, or otherwise, such overdeflection is relieved. The extend of such closing movement of the valves may be limited by suitable setting of the adjustable stops 106, or a bypass resistance 107 to reservoir provided to limit the extent of such throttling action and prevent complete stoppage of slide movements.

It will be noted that the valve 56' has a groove or reduced portion 120 opposite conduit 105 bounded by the tapered shoulders 117 and 118 serving respectively as variable throttles or resistances to flow of the hydraulic pressure medium through 73c or 73d into the groove 120. There is thus provided a resistance variably determining the pressure in conduit 105 as the tracer controlled valve is deflected toward its limit of movement, either upwardly or downwardly. The distributor conduit 104 to the valve closing pressure chambers 103 is connected through the fixed resistance 119 to the reservoir conduit system 100. When the tracer valve 56' is in its normal operative position, as shown in the drawing, or but slightly deflected, as during normal tracing operations, the pressure flow will be shut off from the blocking conduit control 105 while any previous pressure or leakage created pressure through the line into the conduit system 104 will escape through the resistance 119 to reservoir. As the valve 56' is moved upwardly or downwardly to an appreciable extent, the shoulder 117 or 118 will provide a variable resistance to flow of pressure into the line which, as movement of the valve continues, will be of a lesser value than the resistance 119 so that a variable pressure will build up in the conduit system 104; the greater the movement of valve 56' into open position, the greater the pressure build-up and consequent force reaction against the individual throttling and blocking valves. By this pressure build-up these valves will be moved toward or into a closed position. In this manner the rate of actuation of both motor 23 and the motor 24 is slowed down toward the minimum permitted by the adjustable stops 106 or action of bypass 107 irrespective of the actual feed positions of the valves 47 and 48.

This structure is of importance as permitting the machine to operate at relatively high rates of speed when automatically following a pattern surface having slight decrease or variation in angularity or outline while effecting an automatic slowing down of the machine when pronounced changes in direction are dictated by the pattern, thus improving the accuracy and sensitivity of response of the machine, preventing undesirable overrun, insuring more accurate automatic reproduction of the pattern on the work piece and preventing possible damage to cutter or work piece.

What is claimed is:

1. A tracer mechanism for automatic reproducing machines, including a support having a valve receiving bore, a rate motor control valve mounted for movement in the bore, a tracer intermediately pivoted to the support having a pattern contactor at one end and a valve shifting portion at the opposite end whereby tilting of the tracer about its pivot will effect movement of the valve, a hydraulic power circuit, a pair of slide actuating motors, independent actuating circuits for the motors, said circuits each including pressure return conduits for the motors, and blocker valve individual to each of said return conduits, independent rate valves for each of said motor actuating circuits, a rate valve adjusting motor, a power circuit for said motor coupled with the rate motor control valve and controlled by tracer effected movements of the rate motor control valve, and a blocker valve actuating circuit coupled with the rate motor control valve and with said blocker valves for shifting of the blocker valves, said control valve having a circuit completing portion effective on pronounced movement of the rate motor control valve to couple the power circuit to the blocker valve actuating circuit for shifting of the blocker valves to slow down the slide actuating motors.

2. A tracer mechanism for automatic reproducing machines, including a support having a valve receiving bore, a rate motor control valve mounted in the bore, a tracer intermediately pivoted to the support having a pattern contactor at one end and a valve shifting portion at the opposite end whereby tilting of the tracer about its pivot will effect movement of the valve, a hydraulic power circuit, a pair of slide actuating motors, independent actuating circuits for the motors, said circuits each including pressure return conduits for the motors, and blocker valve individual to each of said return conduits, independent rate valves for each of said motor actuating circuits, a rate valve adjusting motor, a power circuit for said motor coupled with the rate motor control valve and controlled by tracer effected movements of the rate motor control valve, a blocker valve actuating circuit, and tracer operated valve means for controlling the activation of the circuit.

3. A tracer mechanism for automatic reproducing machines, including a support having a valve receiving bore, a rate motor control valve mounted in the bore, a tracer intermediately pivoted to the support having a pattern contactor at one end and a valve shifting portion at the opposite end whereby tilting of the tracer about its pivot will effect movement of the valve, a hydraulic power circuit, a pair of slide actuating motors, independent actuating circuits for the motors, said circuits each including pressure return conduits for the motors, and blocker valve individual to each of said return conduits, independent rate valves for each of said motor actuating circuits, a rate valve adjusting motor, a power circuit for said motor coupled with the rate motor control valve and controlled by tracer effected movements of the rate motor control valve, a blocker valve actuating circuit, tracer operated valve means for controlling the activation of the circuit, a power circuit for supplying actuating medium under pressure to the blocker valve actuating circuit by way of the rate motor control valve, said control valve having a variably positionable throttle portion determining the value of the throttle resistance to flow of actuating medium into the blocker valve circuit, and terminal resistance means in said circuit, whereby variations in the throttle resistance varies the effective pressure in the circuit intermediate the throttle resistance and said terminal resistance, the blocker valve circuit having conduits coupling said intermediate effective pressure with said blocker valves.

4. In a contouring machine, a hydraulic slide actuating motor, a pair of conduits coupled with said motor, a hydraulic actuating circuit including a supply conduit and a pair of reservoir conduits, a selector in the circuit alternatively movable to different positions to connect one or the other of the motor conduits with the supply conduit and the other motor conduit with one of the pair of reservoir conduits, a spool on the selector valve effective simultaneously to block the other reservoir conduit in either of the reversing positions of the valve, and a pair of motor control valves, each of said motor control valves having a throttling portion serially interposed in a reservoir conduit providing a resistance to throttle the flow through the conduit, a branch connection from one motor conduit coupled to one of said valves, a branch connection from the other motor conduit coupled to the other of said valves, whereby pressure in either motor conduit will react on its coupled valve to urge the valve into throttle closing position, a spring reacting on the valve to move same into throttle opening position, a piston portion on each of said valves, a cylinder for the piston and a conduit coupling the reservoir conduit system ahead of the throttling portion of the valve with the cylinder, whereby the pressure in said conduit will react on the valve in opposition to the motor conduit pressure to decrease the throttling effect flow resistance of the valve.

5. In a contouring machine, a hydraulic slide actuating motor, a pair of conduits coupled with said motor, a hydraulic actuating circuit including a supply conduit and a pair of reservoir conduits, a selector valve in the circuit alternatively positionable to connect one or the other of the motor conduits with the supply conduit and the other motor conduit with one of the pair of reservoir conduits, a spool on the selector valve effective simultaneously to block the other reservoir conduit, and a pair of motor control valves, each of said valves having a throttling portion serially interposed in a reservoir conduit, a branch connection from one motor conduit coupled to one of said valves, a branch connection from the other motor conduit coupled to the other of said valves, whereby pressure in either motor conduit will react on its coupled valve to urge the valve into throttle closing position, a spring reacting on the valve to move same into throttle opening position, a piston portion on each of said valves, a cylinder for the piston and a conduit coupling the reservoir conduit system ahead of the throttling portion of the valve with the cylinder, whereby the pressure in said conduit will react on the valve in opposition to the motor conduit pressure to decrease the throttling effect of the flow resistance valve, the selector valve having a throttling portion variably positionable to vary the resistance to flow from a motor conduit to the valve interposed in reservoir conduit, whereby the serially effective resistances of the selector valve and motor control valve variably determine the effective pressure in the piston cylinder.

6. In a contouring machine, a hydraulic slide actuating motor, a pair of pressure conduits coupled with said motor, a hydraulic actuating circuit including a supply conduit and a pair of reservoir conduits, a reversing valve in the circuit alternatively movable to different positions to connect one or the other of the motor conduits with the supply conduit and the other motor conduit with one of the pair of reservoir conduits, spools on the selector valve effective simultaneously to block the other reversing reservoir conduit in either of the reversing positions of the valve, and a pair of motor control valves, each of said motor control valves having a throttling portion providing a resistance to throttle the flow through the conduit serially interposed in a reservoir conduit, a branch connection from one motor conduit coupled to one of said valves, a branch connection from the other motor conduit coupled to the other of said valves, whereby pressure in either motor conduit will react on its coupled valve to urge the valve into throttle closing position, a spring reacting on the valve to move same into throttle opening position, a piston portion on each of said valves, a cylinder for the piston and a conduit coupling the reservoir conduit system ahead of the throttling portion of the valve with the cylinder, whereby the pressure in said conduit will react on the valve in opposition to the motor conduit pressure to decrease the throttling effect flow resistance of the valve, the reversing valve having a pair of throttling portions variably positionable to vary the resistance to flow from one or the other of the motor conduits to the reversing valve connected reservoir conduit, whereby the serially effective resistances of the reversing valve and motor control valve variably determine the effective pressure in the piston cylinder of one or the other of the reservoir conduit connected valves upon alternative positionings of the reversing valve.

7. In a contouring machine, a hydraulic slide actuating motor, a pair of conduits coupled with said motor, a hydraulic actuating circuit including a supply conduit and a pair of reservoir conduits, a selector valve in the circuit alternatively positionable to connect one or the other of the motor conduits with the supply conduit and the other motor conduit with one of the pair of reservoir conduits, a spool on the selector valve effective simultaneously to block the other reservoir conduit, and a pair of motor control valves, each of said motor control valves having a throttling portion providing a resistance to throttle the flow through the conduit serially interposed in a reservoir conduit, a branch connection from one motor conduit coupled to one of said valves, a branch connection from the other motor conduit coupled to the other of said valves, whereby pressure in either motor conduit will react on its coupled valve to urge the valve into throttle closing position, a spring reacting on the valve to move same into throttle opening position, a piston portion on each of said valves, a cylinder for the piston and a conduit coupling the reservoir conduit system ahead of the throttling portion of the valve with the cylinder, whereby the pressure in said conduit will react on the valve in opposition to the motor conduit pressure to decrease the throttling effect flow resistance of the valve, and additional means for moving a motor control valve into position to increase the throttling of the flow through the reservoir conduit.

8. In a contouring machine, a hydraulic slide actuating motor, a pair of conduits coupled with said motor, a hydraulic actuating circuit including a supply conduit and a pair of reservoir conduits, a selector valve in the circuit alternatively positionable to connect one or the other of the motor conduits with the supply conduit and the other motor conduit with one of the pair of reservoir conduits, a spool on the selector valve effective simultaneously to block the other reservoir conduit, and a pair of motor control valves, each of said motor control valves having a throttling portion providing a resistance to throttle the flow through the conduit serially interposed in a reservoir conduit, a branch connection from one motor conduit coupled to one of said valves, a branch connection from the other motor conduit coupled to the other of said valves, whereby pressure in either motor conduit will react on its coupled valve to urge the valve into throttle closing position, a spring reacting on the valve to move same into throttle opening position, a piston portion on each of said valves, a cylinder for the piston and a conduit coupling the reservoir conduit system ahead of the throttling portion of the valve with the cylinder, whereby the pressure in said conduit will react on the valve in opposition to the motor conduit pressure to decrease the throttling effect flow resistance of the valve, and additional means for moving a motor control valve into position to increase the throttling of the flow through the reservoir conduit, said means including an additional piston on the motor control valve, a cylinder receiving the piston, an actuating circuit coupled to the cylinder, and valve means for determining the activation of said actuating circuit.

9. In a contouring machine, a hydraulic slide actuating motor, a pair of conduits coupled with said motor, a hydraulic actuating circuit including a supply conduit and a pair of reservoir conduits, a selector valve in the circuit alternatively positionable to connect one or the other of the motor conduits with the supply conduit and the other motor conduit with one of the pair of reservoir conduits, a spool on the selector valve effective simultaneously to block the other reservoir conduit, a pair of motor control valves, each of said motor control valves having a throttling portion providing a resistance to throttle the flow through the conduit serially interposed in a reservoir conduit, a branch connection from one motor conduit coupled to one of said valves, a branch connection from the other motor conduit coupled to the other of said valves, whereby pressure in either motor conduit will react on its coupled valve to urge the valve into throttle closing position, a spring reacting on the valve to move same into throttle opening position, a piston portion on each of said valves, a cylinder for the piston and a conduit coupling the reservoir conduit system ahead of the throttling portion of the valve with the cylinder, whereby the pressure in said conduit will react on the valve in opposition to the motor conduit pressure to decrease the throttling effect flow resistance of the valve, additional means for moving a motor control valve into position to increase the throttling of the flow through the reservoir conduit, said means including an additional piston on the motor control valve, a cylinder receiving the piston, an actuating circuit coupled to the cylinder, valve means for determining the activation of said actuating circuit, and means for limiting the extent of the throttling resulting from the piston effected movement of the motor control valve.

10. A contouring machine as specified in claim 9, in which said limiting means is an abutment physically restricting the piston effected movement of the motor control valve.

11. A contouring machine as specified in claim 9 in which said limiting means comprises a valve throttle by-passing circuit having a resistance to limit the rate of flow through the by-passing circuit.

12. A contouring machine including a source of hydraulic actuating pressure medium, a first slide controlling hydraulic motor and a second slide controlling hydraulic motor, a first pair of conduits coupled with the first motor, a second pair of conduits coupled to the second motor, said conduits of each pair being alternatively employable as pressure or reservoir return conduits, a reservoir conduit individual to each of the motor conduits, valves for determining the effective coupling of each of the motor conduits to its individual reservoir conduit, a reservoir flow throttling valve coupled with each of said reservoir conduits individually to control the flow through such conduit, a tracer movably mounted on the machine having a pattern deflectable contactor, means activatable by movement of the tracer for variably positioning the valves determining the coupling of the motor conduits with the reservoir conduits, and additional means operable by movement of the tracer for effecting simultaneous movement of the reservoir flow throttling valves simultaneously to increase the throttling action of all of said throttling valves.

13. A contouring machine including a source of hydraulic actuating pressure medium, a first slide controlling hydraulic motor and a second slide controlling hydraulic motor, a first pair of conduits coupled with the first motor, a second pair of conduits coupled to the second motor, said conduits of each pair being alternatively employable as pressure or reservoir return conduits, a reservoir conduit individual to each of the motor conduits, valves for determining the effective coupling of each of the motor conduits to its individual reservoir conduit, a reservoir flow throttling valve coupled with each of said reservoir conduits individually to control the flow through such conduit, a tracer movably mounted on the machine having a pattern deflectable contactor, means including a power circuit for determining the position of the motor coupling valves, a tracer valve unit coupled to said power circuit and having portings and a valve portion operable by movement of the tracer and cooperating with said portings for controlling the power circuit positioning of the motor coupling valves, piston and cylinder means associated with the reservoir flow throttling valves, and conduit means connecting said piston and cylinder means with the tracer unit, said tracer valve unit having an additional valve portion operable by the tracer to couple actuating pressure medium through the said conduit means to the cylinders for actuation of the throttling valves.

14. A contouring machine including a source of hydraulic actuating pressure medium, a first slide controlling hydraulic motor and a second slide controlling hydraulic motor, a first pair of conduits coupled with the first motor, a second pair of conduits coupled to the second motor, said conduits of each pair being alternatively employable as pressure or reservoir return conduits, a reservoir conduit individual to each of the motor conduits, valves for determining the effective coupling of each of the motor conduits to its individual reservoir conduit, a reservoir flow throttling valve coupled with each of said reservoir conduits individually to control the flow through such conduit, a tracer movably mounted on the machine having a pattern deflectable contactor, means including a power circuit for determining the position of the motor coupling valves, a tracer valve unit coupled to said power circuit and having portings and a valve portion operable by movement of the tracer and cooperating with said portings for controlling the power circuit positioning of the motor coupling valves, piston and cylinder means associated with the reservoir flow throttling valves, and conduit means connecting said piston and cylinder means with the tracer unit, said tracer valve unit having an additional valve portion operable by the tracer to couple actuating pressure medium through the said conduit means to the cylinders for actuation of the throttling valves, said conduit means including a coupled reservoir shunt conduit intermediate the tracer unit and the cylinders, and a resistance in said shunt conduit to limit the flow of tracer unit controlled pressure medium by way of the shunt conduit to reservoir.

References Cited in the file of this patent
UNITED STATES PATENTS

| | | |
|---|---|---|
| 2,332,533 | Roehm | Oct. 26, 1943 |
| 2,641,969 | Roehm | June 16, 1953 |